United States Patent [19]

Shuttleworth et al.

[11] 4,384,634

[45] May 24, 1983

[54] SOUND ABSORBING STRUCTURE

[75] Inventors: Richmond G. Shuttleworth, South Windsor; Gene R. Snyder, Vernon; Richard P. Ballou, Ellington, all of Conn.

[73] Assignee: United Technologies Corporation, Hartford, Conn.

[21] Appl. No.: 105,010

[22] Filed: Dec. 18, 1979

[51] Int. Cl.³ .......................... E04B 1/82; F02K 1/00
[52] U.S. Cl. ..................................... 181/213; 181/292
[58] Field of Search ................. 181/207, 208, 213–222, 181/284, 286, 287, 291–294, 260; 415/119, 115; 248/632–638; 52/145, 393; 416/500

[56] References Cited

U.S. PATENT DOCUMENTS 3,145,678  8/1964  Shmorhun et al. ............. 248/632 X
3,249,178  5/1966  Watters ........................... 181/286
3,640,357  2/1972  Kitching et al. ................. 181/292
3,687,224  8/1972  Lundin ............................ 181/207
3,735,593  5/1973  Howell ........................ 181/222 X
3,948,346  4/1976  Schindler ....................... 181/292
4,084,351  4/1978  Lam et al. .................... 248/633 X
4,161,231  7/1979  Wilkinson ...................... 181/292

Primary Examiner—Benjamin R. Fuller
Attorney, Agent, or Firm—Gene D. Fleischhauer

[57] ABSTRACT

A sound absorbing structure for use in gas turbine engines is disclosed. Various construction details are developed for mounting the liner of the structure to enable the damping of acoustically caused vibrations and to isolate panels of the liner from mechanically caused vibrations. A viscoelastic material suspends the sound absorbing panels of the liner from the case.

12 Claims, 4 Drawing Figures

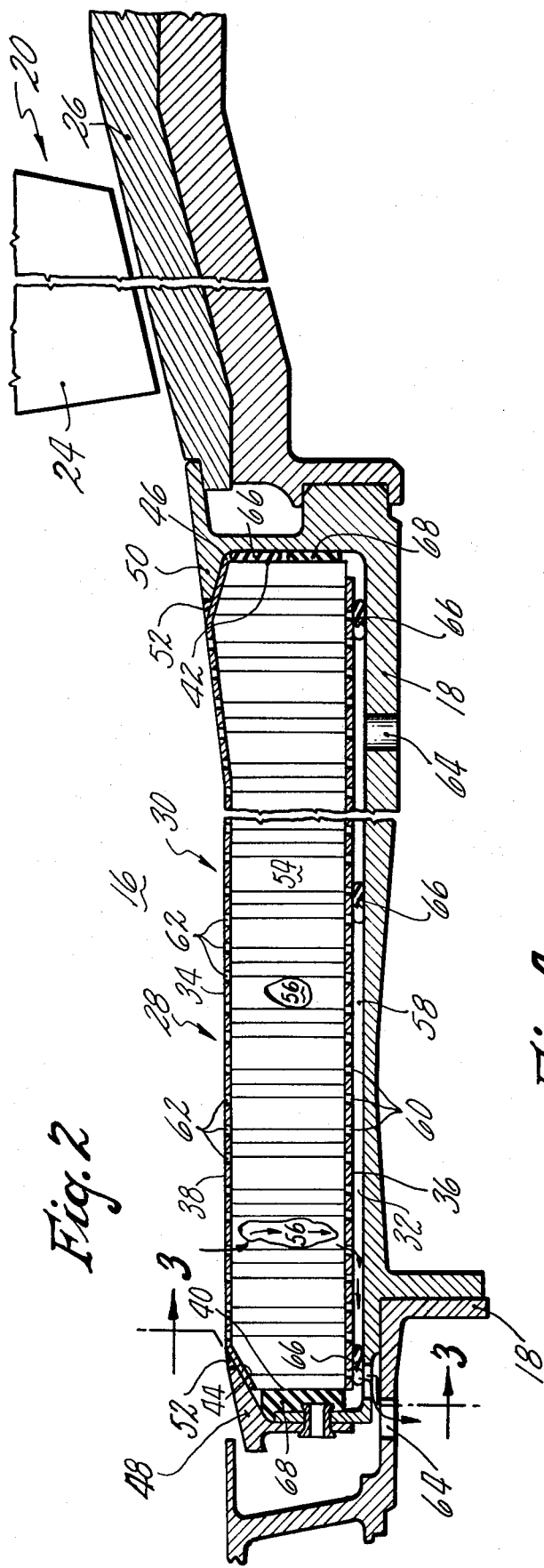
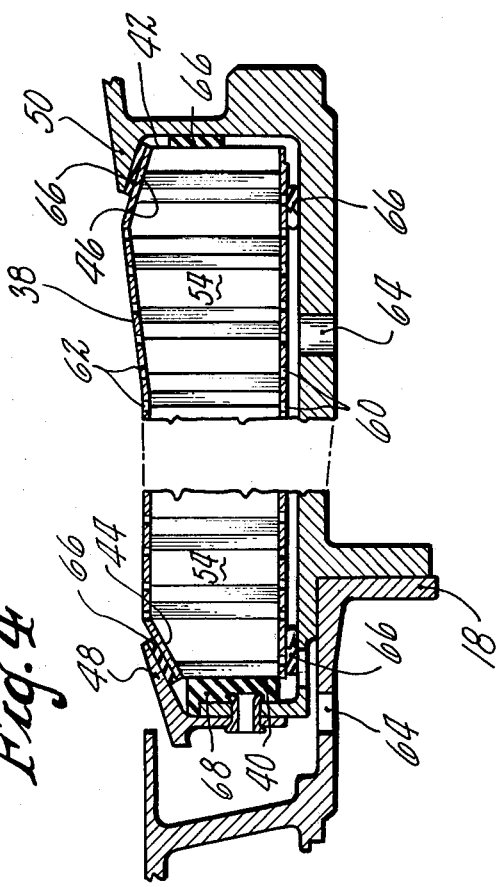

SOUND ABSORBING STRUCTURE

BACKGROUND OF THE INVENTION

1. Field of the Invention

This invention relates to gas turbine engines, and more particularly to a means for mounting a sound absorbing structure to the engine case of such an engine.

2. Description of the Prior Art

A gas turbine engine has a compression section, a combustion section and a turbine section. The compression section has a rotor assembly and a stator assembly. An annular flowpath for working medium gases extends axially through the compression section. The interaction of rotor and stator components with the medium gases generates acoustic vibrations or noise.

In modern engines, sound absorbing structures typically face the working medium flowpath to absorb these acoustic vibrations and decrease the level of noise. One such construction is illustrated in U.S. Pat. No. 3,735,593 to Howell entitled, "Ducted Fans As Used In Gas Turbine Engines Of The Type Known As Fan Jets." In this construction, silencing material, such as perforated panels or porous sheets backed by honeycomb structures, are installed in the engine at various locations.

It is very important that these panels be durable and have an adequate fatigue life. Delamination of the panels and subsequent passage of the delaminated material downstream may cause severe damage to the engine. One cause of delamination is fatigue failure as repeated periodic stresses from acoustically induced mechanical vibrations are absorbed in the panels. Another source of periodic stress in the liner is engine case vibration. The vibrations in the case are particularly severe when the rotor blades successively strike the engine case. Such a strike may unavoidably occur during rapid accelerations or when the rotor assembly is subjected to gyroscopic maneuver loads.

Other sources of structural failure in the liner are not connected with vibrations. One such failure mode may occur during operation of the engine in environments where hail, mist, rain, sleet or snow are present. Water in its varied forms enters the engine along with the working medium gases and may be trapped in the honeycomb panels. As the engine ascends to higher altitudes the water turns to ice and may cause structural damage to the liner. Early fatigue failure of the panels may result and even delamination of the panels can occur with subsequent severe damage to engine components.

In response to the concerns expressed above, scientists and engineers seek to develop effective mounting structures that preserve the structural integrity of liners, in manners consonant with good acoustic performance.

SUMMARY OF THE INVENTION

A primary object of the present invention is to effectively mount a sound absorbing liner in an engine case. Another object is to dampen induced vibrations in the liner resulting both from acoustic vibrations in the flowpath and from mechanical vibrations in the case. Another object is to isolate the liner from mechanical vibrations in the case.

According to the present invention, a viscoelastic material of a sound absorbing liner elastically suspends the liner from an engine case for isolation of the liner from rotor induced vibrations in the engine case.

According to one embodiment of the present invention, the viscoelastic material is adhered to a panel of the sound absorbing liner and urges the liner inwardly against a stop on the inner wall of the case forming an acoustic cavity between the liner and the case.

A primary feature of the present invention is the viscoelastic material of the liner for mounting and for spacing apart the liner from the engine case. In one embodiment, the liner is pressed against the case by the viscoelastic material. Sound absorbing chambers in the liner are communicatively joined to the acoustic cavity between the liner and the case to provide effective chambers with increased apparent depth.

A principal advantage of the present invention is the decreased susceptibility of the structure to high cycle fatigue. The liner is isolated from mechanically induced vibrations in the engine case. Acoustically induced vibrations in the liner are damped by viscous and Coulomb effects. Viscous damping is provided by the viscoelastic material. In one embodiment, Coulomb damping is provided by rubbing contact between the liner and the case. In one embodiment, the capacity of the structure to absorb acoustic vibrations is increased by increasing the apparent depth of the sound absorbing cavities.

The foregoing and other objects, features and advantages of the present invention will become more apparent in the light of the following detailed description of preferred embodiment thereof as discussed and illustrated in the accompanying drawing.

BRIEF DESCRIPTION OF THE DRAWING

FIG. 2 is a cross-section view of a portion of the outer case and associated structure.

FIG. 4 is a cross-section view corresponding to the FIG. 2 view showing an alternate embodiment.

DETAILED DESCRIPTION

Figure 1:
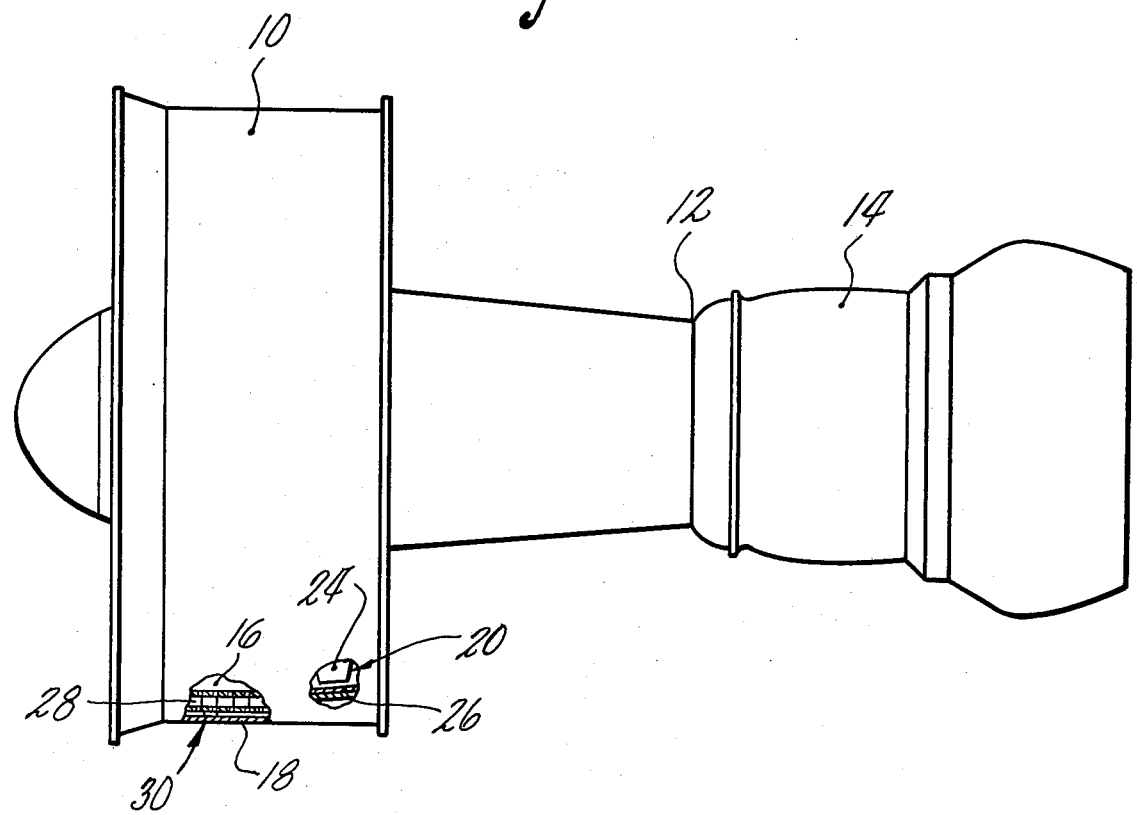
FIG. 1 is a simplified, side elevation view of a turbofan engine with a portion of the outer case broken away to reveal a sound absorbing liner and a rotor blade.

A gas turbine engine embodiment of the invention is illustrated in FIG. 1. The principal sections of the engine include a compression section 10, a combustion section 12 and a turbine section 14. An annular flowpath 16 for working medium gases extends axially through the engine. A stator structure including an engine outer case 18 bounds the working medium flowpath. A rotor structure 20 is disposed inwardly of the outer case and has an axis of rotation A. In the compression section, the rotor structure includes a rotor disk (not shown) and a plurality of rotor blades 24. The rotor blades extend outwardly from the disk across the working medium flowpath into proximity with the outer case. The outer case has a rub strip 26 facing the blades and contains a sound absorbing liner 28. The sound absorbing liner extends circumferentially about the interior of the outer case and faces the working medium flowpath. The liner in combination with the case forms a sound absorbing structure 30.

FIG. 2 is a cross-sectional view of a portion of the outer case 18 and associated structure such as the rotor blade 24 and the sound absorbing liner 28. The case is adapted by a circumferentially extending groove 32 to receive the liner. The liner engages the case and includes one or more sound absorbing panels 34. Each panel has a first wall, such as outer wall 36 and a second wall such as inner wall 38, an upstream wall 40 and a downstream wall 42. The upstream wall and the downstream wall are substantially perpendicular to the inner wall. The inner wall has an upstream end 44 and a downstream end 46. Both the upstream end and the downstream end are angled with respect to the flowpath. An upstream stop 48 and a downstream stop 50 on the inner case are angled to receive the outer wall. The upstream stop mechanically engages the upstream end of the inner wall. The downstream stop mechanically engages the downstream end of the inner wall. A means 52 of viscoelastic material is blended between the stops and the inner wall for aerodynamic fairing between the case and the inner wall.

An internal structure, such as the honeycomb structure 54, is bonded to the inner wall 38. The honeycomb structure extends outwardly and is bonded to the outer wall 36 to form one or more first cavities 56 between the inner wall and the outer wall. The outer wall is spaced from the engine case to form one or more second cavities 58.

The outer wall 36 of each panel has a plurality of passages 60 therethrough placing each of the first cavities 56 in fluid (gas and liquid) communication with one or more of the second cavities 58. The inner wall has a plurality of passages 62 therethrough placing each of said first cavities in gas communication with the flowpath 16. A means for removing liquid such as holes 64 in the bottom of the outer case 18 are in fluid communication with each of the second cavities.

A first means, such as the rubber pads 66, formed of viscoelastic material for mounting the liner 28 to the engine case 18 and for spacing the panel 34 apart from the engine case, engages the outer case. The pads 66 engage the engine case, for example, at the downstream wall 42 and the outer wall 66 and act to elastically suspend each panel. In the installed condition the pads are elastically compressed and urge the panels 34 inwardly. Each pad is free to expand in at least one direction. One satisfactory viscoelastic material for the pads is cured silicone rubber, such as L-13275 material distributed by Acushnet Process Company, New Bedford, Mass. or JL-78-71-L material distributed by Jonal Laboratories, Meriden, Connecticut.

In addition to the first means 66 of viscoelastic material, a second means 68 formed of viscoelastic material is installed between the sound absorbing panel and the outer case. The second means formed of viscoelastic material is installed in the uncured state to act as an adhesive and as a filler material. After installation, this viscoelastic material cures rapidly (within twenty-four hours) and augments the elastic suspension of the sound absorbing panel. One satisfactory viscoelastic material is silicone rubber, such as RTV-106 material distributed by the General Electric Company, Waterford, N.Y. or DC-140 material distributed by the Dow Corning Corporation, Midland, Mich.

Figure 3:
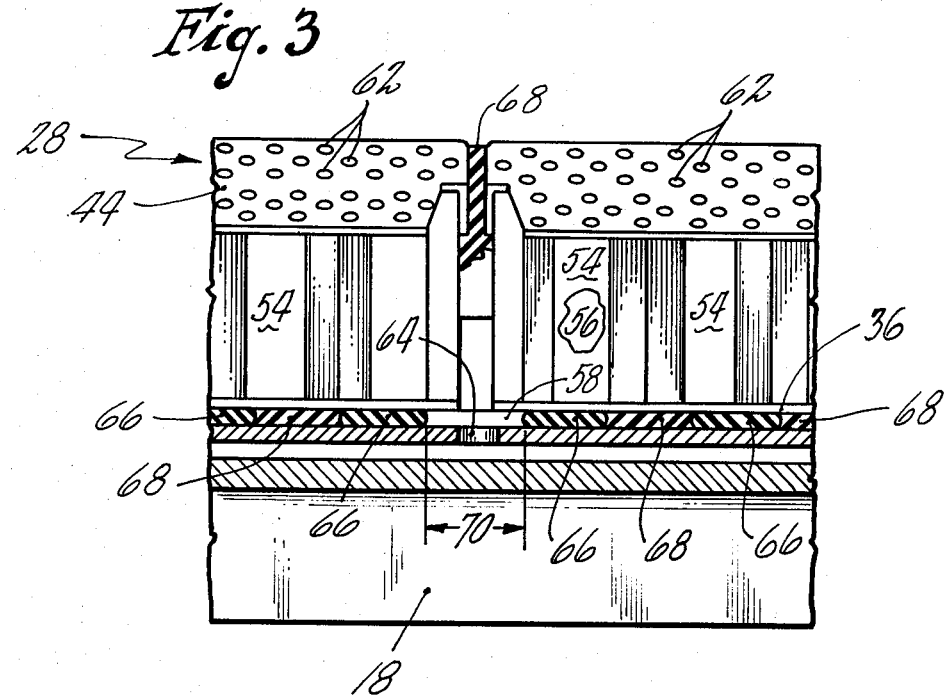
FIG. 3 is a sectional view of the liner and the case taken along the line 3—3 as shown in FIG. 2.

As shown in FIG. 3, the sound absorbing panels of the liner are spaced circumferentially about the engine. Each panel of the liner extends approximately one hundred and twenty degrees (120°). As will be realized, the liner may have a single panel extending fully about the circumference of the engine case or may be segmented as shown. A second means 68 formed of viscoelastic material is disposed circumferentially between each pair of adjacent panels, and between the pads 66. A circumferential gap 70 between the bottom-most pads on the engine places in fluid communication all of the one or more second cavities.

FIG. 4 is an alternate embodiment of FIG. 2 which has an inner wall 38 spaced at the upstream end 44 from the upstream stop 48 and at the downstream end 46 from the downstream stop 50. A first means formed of viscoelastic material such as pads, as represented by the single pad 66 at the upstream end and the single pad 66 at the downstream end, extends between the inner wall and the stops.

During operation of a gas turbine engine, working medium gases are directed along the annular flowpath 16 through the compression section 10. These high velocity gases and the rotating and stationary components through which these gases pass cause acoustic vibrations or noise. Part of the noise is absorbed by the sound absorbing liner 28 in the compression section. The fluid communication enabled by the passages 60 through the outer wall 36 of each sound absorbing panel 34 enables the first cavities 56 of the panel to cooperate acoustically with the second cavities 58 outwardly of the panels between the panel and the case. This acoustic cooperation increases the ability of the liner to absorb vibrations as compared with a liner having only an identical sound absorbing panel but having no backing cavity.

The acoustic vibrations in the sound absorbing panel induce mechanical vibrations in the panel. These mechanical vibrations cause periodic deflections in the viscoelastic material such as the first means (pads 66) and the second means 68 (filler) which extend between the engine case and the sound absorbing panel. Because these viscoelastic materials have considerable internal friction, the materials absorb energy from the mechanically vibrating parts and convert the energy from mechanical motion into heat. This absorption of energy is a form of viscous damping and decreases the amplitude of the vibrations in the vibrating parts. An increase in the fatigue life of the panels results as compared with undamped panels. As shown in the FIG. 2 embodiment, additional damping results as Coulomb damping or dry-friction damping at the upstream end 44 and downstream end 46 of the inner wall as the wall vibrates against the upstream stop 48 and the downstream stop 50 on the engine case. The viscoelastic pads, which are compressed like elastic springs during installation, urge the liner inwardly increasing the normal force between these surfaces and concomitantly the amount of Coulomb damping. The spring-like action of the viscoelastic material is important for another reason.

As the rotor assembly 22 experiences rapid accelerations in speed or is subjected to gyroscopic maneuver loads, the rotor blades 24 strike the abradable rub strip 26 on the engine case. The grinding contact between the blade and the strip causes mechanical vibrations in the engine case. These vibrations are transmitted through the engine case. The first viscoelastic means and the second viscoelastic means act to elastically suspend each of the panels 34 of the liner 28 from the engine case. This elastic suspension blocks the transmission of vibrations from the engine case to the liner and to the sound absorbing panel of the liner. As a result, the disturbance produced in the panel by vibrations in the case is much reduced as compared with a panel which is rigidly attached to the engine case. As shown in the FIG. 2 embodiment, the contact area capable of transmitting mechanical vibrations is limited to the area between the upstream stop 48 of the case and the upstream end 44 of the inner wall and the downstream stop 50 of the case and the downstream end 46 of the inner wall. Even this limited area is eliminated in the FIG. 4 embodiment where viscoelastic pads 66 are substituted for the mechanical engagement of the FIG. 2 embodiment.

Water brought on board during operation of the engine by the incoming working medium gases, is drained from the liner 28. The fluid communication between the first cavities 56 of the sound absorbing panel 34 and the second cavities 58 extending between the panel and the case enables the drainage of water from the first cavity. This drainage of water prevents the formation of ice which would occur if the water were trapped by an outer wall not having passages 60. The ice would cause rupture of the internal structure of the sound absorbing panel with the possible loss of panel components into the gas path of the engine. As described earlier, liquid water is removed through the passages in the outer wall 36, the second cavity and holes through the case of the engine, such as hole 64.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A sound absorbing liner of the type mounted to the case of a gas turbine engine, wherein the improvement comprises:
   a liner having at least one sound absorbing panel having an upstream wall, a downstream wall, an inner wall and an outer wall each of which is adapted to contact means formed of viscoelastic material;
   means formed of viscoelastic material which extends from at least one of the said walls of the panel to the case for mounting the panel within the case and which is trapped by the wall of the panel and the case between the wall of the panel and the case for spacing the panel apart from the engine case to isolate the panel from mechanically induced vibrations in the engine case and to absorb acoustically induced vibrations in the liner.

2. A sound absorbing structure for a gas turbine engine of the type having a flowpath extending axially therethrough, which comprises:
   an engine case having a circumferentially extending groove which adapts the case to receive a liner;
   an acoustic liner having at least one sound absorbing panel facing the engine flowpath disposed in the groove in the case, the panel of the liner having an inner wall, an outer wall, an upstream wall and a downstream wall, each of which is adapted to contact means formed of viscoelastic material, and having
      means formed of viscoelastic material extending between at least one wall of the panel and the case for mounting the panel to the engine case and trapped by the wall of the panel and the case between the wall of the panel and the case for spacing said panel apart from the engine case;
   wherein the means formed of viscoelastic material isolates the sound absorbing panel of the liner from mechanically induced vibrations in the engine case and damps acoustically induced vibrations in the liner.

3. A sound absorbing liner of the type mounted to the case of a gas turbine engine and disposed in a circumferentially extending groove in the case, wherein the improvement comprises:
   a liner having at least one sound absorbing panel having an upstream wall, a downstream wall, an inner wall, and an outer wall, each of which is adapted to contact means formed of viscoelastic material, the inner wall and the outer wall adapting the panel of the liner to extend radially inwardly of a portion of the case and to extend radially outwardly of a portion of the case; and,
   means formed of viscoelastic material which extends from at least one of said walls of the panel to the case for mounting the panel within the case, the means being trapped by the wall of the panel and the case between the wall of the panel and the case for spacing the panel apart from the engine case to isolate the panel from mechanically induced vibrations in the engine case and to absorb acoustically induced vibrations in the liner.

4. A sound absorbing structure for a gas turbine engine of the type having a flowpath extending axially therethrough, which comprises:
   an engine case having a circumferentially extending groove which adapts the case to receive an acoustic liner;
   an acoustic liner disposed in the groove in the case such that a portion of the case is radially inwardly of the liner and a portion of the case is radially outwardly of the liner, the liner having
      at least one sound absorbing panel facing the engine flowpath which is disposed in said groove and which has an inner wall, and outer wall, an upstream wall and a downstream wall, each of which adapts the panel to contact means formed of viscoelastic material, and
      means formed of viscoelastic material which extends between a wall of the panel and the case for mounting the panel to the engine case and which is trapped by said wall of the panel and the case between the wall of the panel and the case for spacing said panel apart from the engine case;
   wherein the means of viscoelastic material isolates the sound absorbing panel of the liner from mechanically induced vibrations in the engine case and damps acoustically induced vibrations in the liner.

5. The invention as claimed in claim 1 or claim 3 wherein the liner is formed of a plurality of panels which are spaced circumferentially about the engine.

6. The invention as claimed in claim 5 which further includes viscoelastic material disposed circumferentially between each pair of adjacent panels.

7. The invention as claimed in claim 2 or claim 4 wherein the panel of the liner extends circumferentially about the engine case, wherein said wall of the panel from which said means formed of viscoelastic material extends is a first wall, wherein one of the remaining walls is a second wall, wherein the second wall abuts the engine case, and wherein said means formed of viscoelastic material for providing viscous damping of induced vibrations is trapped between the engine case and the first wall for urging the second wall into contact with the engine case to provide frictional damping of induced vibrations.

8. The invention as claimed in claim 7 wherein said first wall is substantially perpendicular to said second wall.

9. The invention as claimed in claim 7
wherein said first wall and said second wall are spaced apart to form one or more first cavities therebetween for absorbing acoustic vibrations, and wherein said second wall bounds the working medium flowpath and has a plurality of passages therethrough placing said first cavities in gas communication with the flowpath;
wherein one or more second cavities are formed between the first wall and the case for absorbing acoustic vibrations and wherein the first wall has a plurality of passages therethrough placing each of said first cavities in gas communication with one or more of said second cavities.

10. The invention as claimed in claim 2 or claim 4 wherein the panel of the liner extends circumferentially about the engine case
wherein said wall of the panel from which said means formed of viscoelastic material extends is a first wall,
wherein one of the remaining walls of the panel is a second wall spaced from the engine case, and
a second means of viscoelastic material is trapped between said second wall and said case for mounting and for spacing apart the second wall of the panel of the liner from the engine case.

11. The invention as claimed in claim 10 wherein said first wall is substantially perpendicular to said second wall.

12. The invention as claimed in claim 10
wherein said first wall and said second wall are spaced apart to form one or more first cavities therebetween for absorbing acoustic vibrations, and wherein said second wall bounds the working medium flowpath and has a plurality of passages therethrough placing said first cavities in gas communication with the flowpath;
wherein one or more second cavities are formed between the first wall and the case for absorbing acoustic vibrations and wherein the first wall has a plurality of passages therethrough placing each of said first cavities in gas communication with one or more of said second cavities.

* * * * *